(12) United States Patent
Mori

(10) Patent No.: US 9,690,994 B2
(45) Date of Patent: Jun. 27, 2017

(54) LANE RECOGNITION DEVICE

(71) Applicant: HONDA MOTOR CO., LTD., Minato-Ku, Tokyo (JP)

(72) Inventor: Naoki Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/666,388

(22) Filed: Mar. 24, 2015

(65) Prior Publication Data

US 2015/0310283 A1 Oct. 29, 2015

(30) Foreign Application Priority Data

Apr. 25, 2014 (JP) ................................. 2014-090970

(51) Int. Cl.
| | | |
|---|---|---|
| *G06K 9/00* | (2006.01) | |
| *B60R 1/00* | (2006.01) | |
| *G06K 9/46* | (2006.01) | |
| *B60W 30/12* | (2006.01) | |

(52) U.S. Cl.
CPC ............ *G06K 9/00798* (2013.01); *B60R 1/00* (2013.01); *B60W 30/12* (2013.01); *G06K 9/4604* (2013.01); *B60R 2300/804* (2013.01)

(58) Field of Classification Search
None
See application file for complete search history.

(56) References Cited

U.S. PATENT DOCUMENTS

| | | | |
|---|---|---|---|
| 5,852,791 A * | 12/1998 | Sato ....................... G01C 21/30 340/988 |
| 6,813,370 B1 | 11/2004 | Arai | |
| 8,195,362 B2 | 6/2012 | Buerkle et al. | |
| 9,395,192 B1* | 7/2016 | Silver ................ G06K 9/00798 |
| 2005/0270374 A1* | 12/2005 | Nishida ................ G05D 1/0246 348/148 |

(Continued)

FOREIGN PATENT DOCUMENTS

| | | |
|---|---|---|
| DE | 102006047636 A1 | 4/2008 |
| DE | 102010020984 A1 | 10/2011 |

(Continued)

OTHER PUBLICATIONS

Search Report and Office Action dated Apr. 18, 2016 issued in counterpart German Patent Application No. 10 2015 207 373.4.

*Primary Examiner* — Vu Le
*Assistant Examiner* — Samah Beg
(74) *Attorney, Agent, or Firm* — Carrier Blackman & Associates, P.C.; Joseph P. Carrier; Jeffrey T. Gedeon

(57) ABSTRACT

A demarcation line candidate recognizing unit recognizes demarcation line candidates which are candidates for a pair of right and left demarcation lines demarcating a lane based on edge points having predetermined continuity in an image captured by a camera. A demarcation line candidate modifying unit excludes edge points whose corresponding positions in a real space are a predetermined distance or more away from the camera in the case where parallelism between the pair of right and left demarcation line candidates recognized by the demarcation line candidate recognizing unit is equal to or less than a predetermined level and re-recognizes the pair of right and left demarcation line candidates based on the edge points having predetermined continuity among the edge points which have not been excluded.

7 Claims, 8 Drawing Sheets

(56) References Cited

U.S. PATENT DOCUMENTS

| | | | |
|---|---|---|---|
| 2007/0075892 A1* | 4/2007 | Horibe | G01S 17/023 342/70 |
| 2008/0310679 A1* | 12/2008 | Aoki | G06K 9/00798 382/104 |
| 2008/0317288 A1* | 12/2008 | Aoki | G06K 9/00798 382/104 |
| 2009/0034799 A1 | 2/2009 | Nishida et al. | |
| 2009/0041303 A1* | 2/2009 | Aoki | G06K 9/00798 382/104 |
| 2009/0041337 A1* | 2/2009 | Nakano | G06K 9/00798 382/154 |
| 2009/0268026 A1* | 10/2009 | Mori | G06K 9/00798 348/148 |
| 2009/0284597 A1* | 11/2009 | Nakamori | G06K 9/00798 348/148 |
| 2009/0296987 A1* | 12/2009 | Kageyama | G06K 9/00798 382/103 |
| 2010/0014707 A1* | 1/2010 | Nakamori | G06K 9/4652 382/103 |
| 2010/0121569 A1* | 5/2010 | Nakamura | G01C 21/30 701/532 |
| 2010/0295668 A1* | 11/2010 | Kataoka | B62D 15/025 340/435 |
| 2011/0238252 A1* | 9/2011 | Takeda | B60W 40/072 701/31.4 |
| 2012/0050074 A1* | 3/2012 | Bechtel | B60R 1/04 340/988 |
| 2013/0173232 A1 | 7/2013 | Meis et al. | |
| 2013/0266175 A1* | 10/2013 | Zhang | G06T 7/0083 382/103 |
| 2014/0152829 A1* | 6/2014 | Suzuki | G08G 1/167 348/148 |
| 2014/0340518 A1* | 11/2014 | Kambe | G06K 9/00791 348/148 |
| 2015/0235090 A1* | 8/2015 | Kumano | G06K 9/00798 340/435 |
| 2015/0354976 A1* | 12/2015 | Ferencz | G01C 21/3602 382/104 |
| 2016/0012298 A1* | 1/2016 | Maeda | G06K 9/00798 382/104 |
| 2016/0026879 A1* | 1/2016 | Maeda | G06K 9/00798 382/104 |
| 2016/0231130 A1* | 8/2016 | Akiyama | B60W 30/09 |
| 2017/0068862 A1* | 3/2017 | Mueter | G06K 9/00798 |

FOREIGN PATENT DOCUMENTS

| | | |
|---|---|---|
| JP | 2004310522 A  * | 11/2004 |
| JP | 4603970 B2 | 12/2010 |

* cited by examiner

LANE RECOGNITION DEVICE

CROSS-REFERENCE TO RELATED APPLICATION

Priority is claimed under 35 U.S.C. 119 on Japanese Patent Application No. 2014-090970, filed on Apr. 25, 2014, the contents of which are incorporated herein by reference.

BACKGROUND OF THE INVENTION

Field of the Invention

The present invention relates to a lane recognition device which recognizes a lane based on an image captured by a camera.

Description of the Related Art

Conventionally, there has been known a lane recognition device which recognizes a lane boundary by detecting a lane mark such as a white line for demarcating a traveling lane provided on a road from an image of the road ahead of a vehicle captured by a camera mounted in the vehicle.

In the case where a lane mark on the main lane side is not laid on a branch point between a main lane and a branch lane, the conventional lane recognition device might erroneously recognize the lane mark on the branch lane as a lane mark on the main lane, thus having low recognition accuracy of the branch lane.

The present invention has been made in view of the above background. Therefore, an object of the present invention is to provide a lane recognition device capable of appropriately recognizing a demarcation position of the main lane even in the case where a lane mark on the main lane side is not laid on the branch point between the main lane and the branch lane.

SUMMARY OF THE INVENTION

A lane recognition device of the present invention includes: an edge point extracting unit which extracts edge points whose luminance difference from a surrounding portion is equal to or more than a predetermined level, from an image captured by a camera mounted in a vehicle; a demarcation line candidate recognizing unit which recognizes demarcation line candidates which are candidates for a pair of right and left demarcation lines demarcating a lane based on the edge points having predetermined continuity; and a demarcation line candidate modifying unit which excludes edge points whose corresponding positions in a real space are a predetermined distance or more away from the camera in a case where parallelism between the pair of right and left demarcation line candidates recognized by the demarcation line candidate recognizing unit is equal to or less than a predetermined level, and re-recognizes the pair of right and left demarcation line candidates based on the edge points having the predetermined continuity among the edge points which were not excluded.

In the present invention, in the case where parallelism between the pair of right and left demarcation line candidates recognized by the demarcation line candidate recognizing unit is equal to or less than a predetermined level (in the case where it is determined that the demarcation line candidates are not parallel to each other), it is probable that the lane mark on the main lane on which the vehicle is traveling is interrupted and that a lane mark on the branch lane side is recognized. Accordingly, in this case, the demarcation line candidate modifying unit excludes the edge points corresponding to far positions in the real space and re-recognizes a demarcation line candidate.

This enables the demarcation line candidate to be recognized based on edge points extracted from the lane mark on the main lane located near the vehicle by excluding the edge points extracted from the image portions of the lane mark on the branch lane going away from the demarcation line on the main lane as the distance from the vehicle increases. Therefore, even in the case where the lane mark on the main lane side is not laid on a branch point between the main lane and the branch lane, the position of the demarcation line on the main lane is able to be appropriately recognized.

Furthermore, the lane recognition device further includes an edge point information holding unit which holds information of the edge points excluded by the demarcation line candidate modifying unit and is characterized in that, in a case where the parallelism between the pair of recognized right and left demarcation line candidates shifts from a state of being the predetermined level or less to a state of exceeding the predetermined level, the demarcation line candidate recognizing unit recognizes the pair of demarcation line candidates by using the information of the edge points held by the edge point information holding unit in a next demarcation line candidate recognizing process.

According to this configuration, in the case where the parallelism between the pair of right and left demarcation line candidates, which have been extracted by the demarcation line candidate extracting process, temporarily decreases to the predetermined level or less due to the effect of vibration or the like of the vehicle, the pair of right and left lane demarcation line candidates are able to be recognized quickly by using the information held by the excluded edge point information holding unit when the vibration or the like of the vehicle settles.

Furthermore, in the case where the parallelism between the pair of right and left demarcation line candidates recognized by the demarcation line candidate recognizing unit is the predetermined level or less if an edge point sequence having predetermined continuity to an edge point sequence which has not been excluded and whose corresponding real space position is the predetermined distance or more, is extracted, the demarcation line candidate modifying unit recognizes the demarcation line candidate by joining both of the edge point sequences together.

According to this configuration, the recognition accuracy of the demarcation line candidates is able to be increased by joining the edge point sequence corresponding to a near position from the vehicle and the edge point sequence corresponding to a far position from the vehicle together.

Furthermore, the lane recognition device further includes a steering control unit which controls a steering mechanism of the vehicle so that the vehicle travels in a vicinity of an intermediate position between the pair of right and left demarcation line candidates recognized by the demarcation line candidate recognizing unit.

According to this configuration, in the case where the vehicle travels on the branch point between the main lane and the branch lane, the steering control unit controls the steering mechanism so that the vehicle travels in the vicinity of the intermediate position between the pair of right and left demarcation line candidates recognized by the demarcation line candidate recognizing unit, thereby preventing the vehicle from being drawn to the branch lane side.

Moreover, the demarcation line candidate modifying unit determines the parallelism between the pair of right and left demarcation line candidates at a plurality of places each located a given distance from the vehicle and considers a distance between a place where the parallelism between the pair of right and left demarcation line candidates is the predetermined level or less and the vehicle as the predetermined distance.

According to this configuration, the parallelism between the pair of right and left demarcation line candidates is determined at a plurality of places each located a given distance from the vehicle, thereby preventing the parallelism from being incorrectly calculated at a place where the parallelism suddenly changes as in the branch point of a road, which may occur in the case of a long determination interval of parallelism.

Subsequently, according to another aspect of the present invention, there is provided a vehicle including: a camera which captures an image of surroundings; an edge point extracting unit which extracts edge points whose luminance difference from a surrounding portion is equal to or more than a predetermined level from an image captured by the camera; a demarcation line candidate recognizing unit which recognizes demarcation line candidates which are candidates for a pair of right and left demarcation lines demarcating a lane based on the edge points having predetermined continuity; and a demarcation line candidate modifying unit which excludes edge points whose corresponding positions in a real space are a predetermined distance or more away from the camera in a case where parallelism between the pair of right and left demarcation line candidates recognized by the demarcation line candidate recognizing unit is equal to or less than a predetermined level and re-recognizes the pair of right and left demarcation line candidates based on the edge points having the predetermined continuity among the edge points which were not excluded.

According to the present invention, the same operation and effect as those of the foregoing lane recognition device of the present invention can be achieved.

Furthermore, according to another aspect of the present invention, there is provided a lane recognition method including: an edge point extracting step of extracting edge points whose luminance difference from a surrounding portion is equal to or more than a predetermined level from an image captured by a camera mounted in a vehicle; a demarcation line candidate recognizing step of recognizing demarcation line candidates which are candidates for a pair of right and left demarcation lines demarcating a lane based on the edge points having predetermined continuity; a demarcation line candidate modifying step of excluding edge points whose corresponding positions in a real space are a predetermined distance or more away from the camera in a case where parallelism between the pair of right and left demarcation line candidates recognized in the demarcation line candidate recognizing step is equal to or less than a predetermined level, and re-recognizing the pair of right and left demarcation line candidates by joining the edge points having the predetermined continuity among the edge points which were not excluded; an excluded edge point information holding step of holding information of the edge points excluded in the demarcation line candidate modifying step; and a parallelism recovering step of recognizing the pair of demarcation line candidates by using the information on the edge points held in the edge point information holding step in a next demarcation line candidate recognizing step in a case where the parallelism between the pair of right and left demarcation line candidates recognized in the demarcation line candidate recognizing step shifts from a state of being the predetermined level or less to a state of exceeding the predetermined level.

By applying the lane recognition method of the present invention to a vehicle for implementation, the same effect as those of the foregoing lane recognition device of the present invention can be achieved.

DESCRIPTION OF THE PREFERRED EMBODIMENTS

An embodiment of a lane recognition device according to the present invention will be described with reference to FIGS. 1 to 8.

Figure 1:
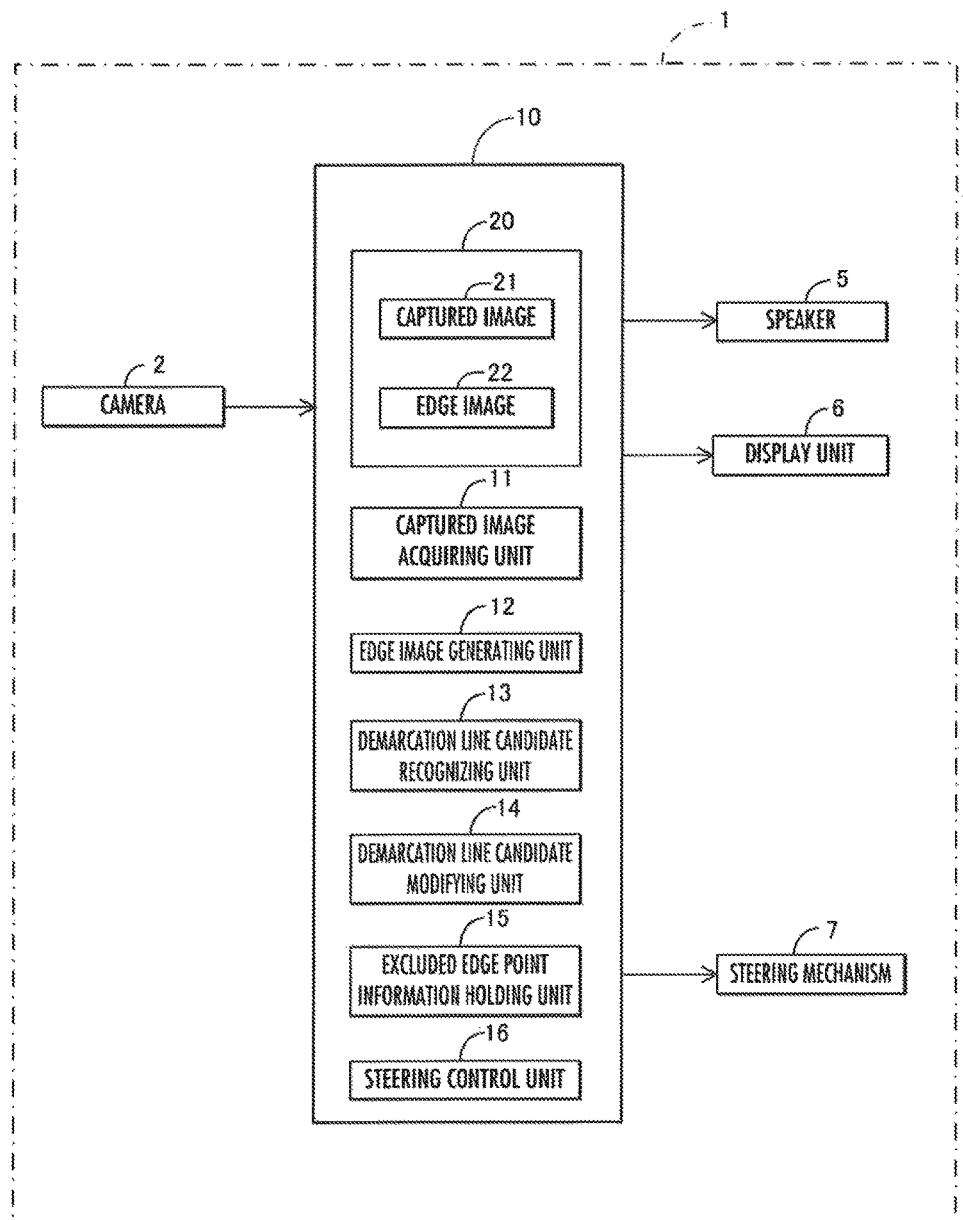
FIG. 1 is a block diagram illustrating a lane recognition device.

Referring to FIG. 1, a lane recognition device 10 is mounted in a vehicle 1 (corresponding to a vehicle of the present invention) provided with a camera 2 (color camera), a speaker 5, a display unit 6, and a steering mechanism 7.

The lane recognition device 10 is an electronic unit including a CPU, a memory, various interface circuits and the like, which are not illustrated, and executes programs for lane recognition held in the memory in the CPU to function as a captured image acquiring unit 11, an edge image generating unit 12 (including a function of an edge point extracting unit of the present invention), a demarcation line candidate recognizing unit 13, a demarcation line candidate modifying unit 14, an excluded edge point information holding unit 15, and a steering control unit 16. Moreover, the lane recognition device 10 performs a lane recognition method of the present invention.

Figure 2:
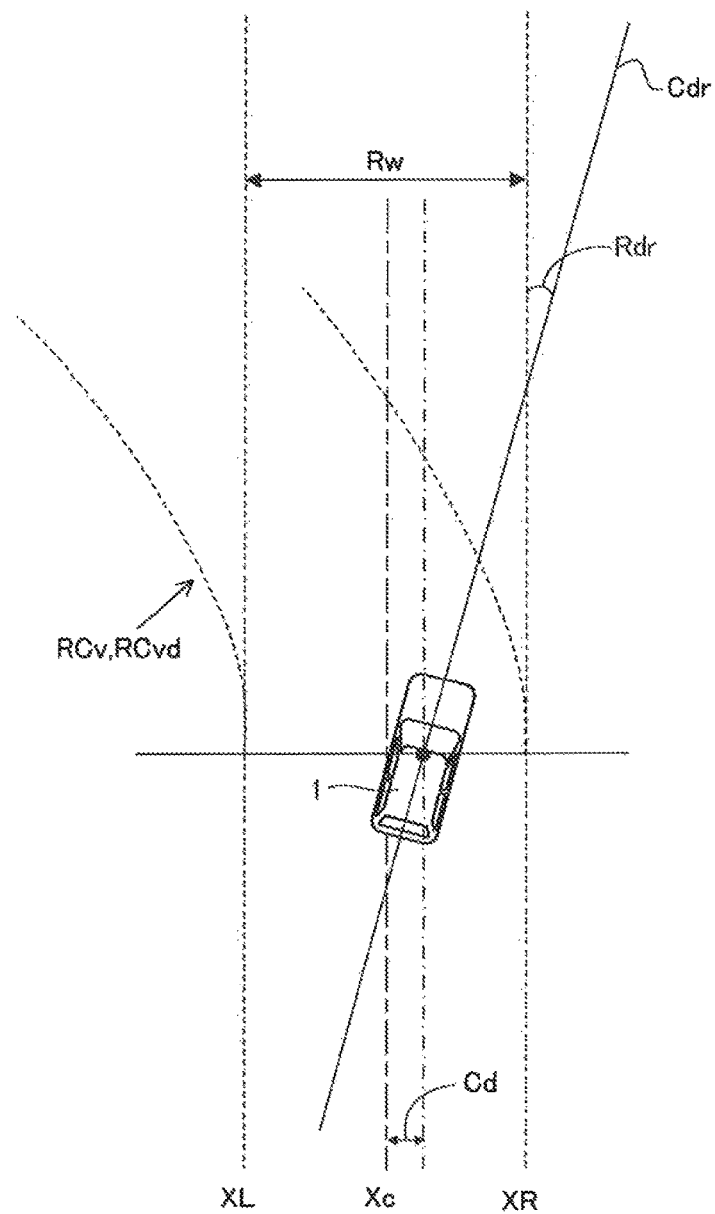
FIG. 2 is an explanatory diagram illustrating feature values (a curvature, a change in curvature, a vehicle lateral position, and a lane direction) of a road.
Figure 3:
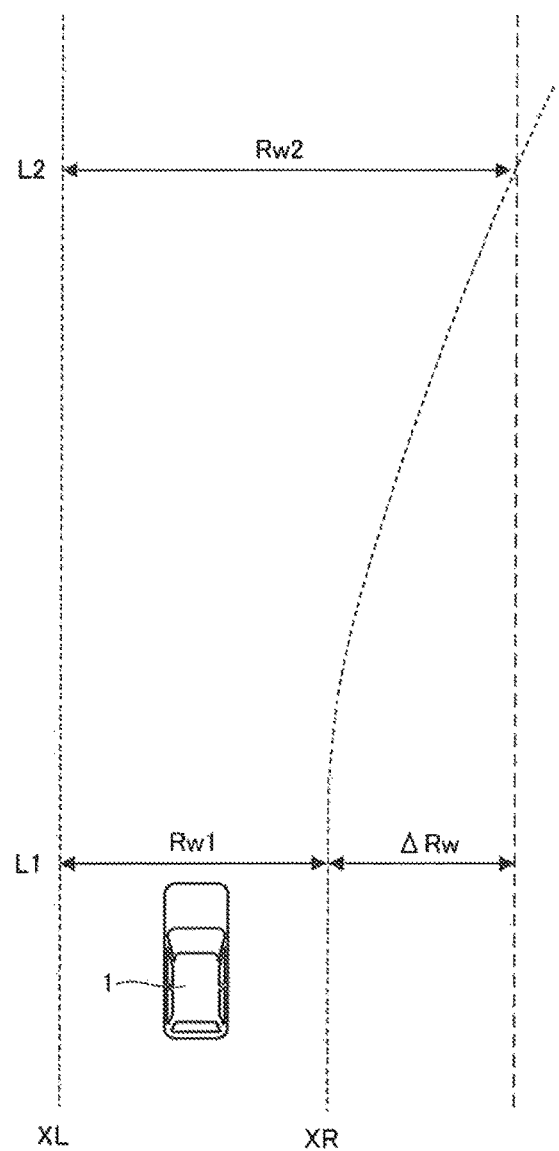
FIG. 3 is a diagram illustrating feature values (a lane width and a variation in the lane width) of a road.

As illustrated in FIGS. 2 and 3, the lane recognition device 10 defines the shape of a lane on a road on which the vehicle (self-vehicle) 1 is traveling by using a feature value vector VR (=(RCv, RCvd, Cd, Rdr, Rw, ΔRw)) with a curvature (RCv), a rate of change in curvature (RCvd), a vehicle lateral position (Cd), a lane tilt (Rdr), a lane width (Rw), and a variation in the lane width (ΔRw) as components.

Referring to FIG. 2, the lane recognition device 10 recognizes a left demarcation line XL of the lane (a line representing the position demarcating the left side of the lane) and a right demarcation line XR of the lane (a line representing the position demarcating the right side of the lane) by processing performed by the demarcation line candidate recognizing unit 13 or the demarcation line candidate modifying unit 14 described later. The curvature (RCv) is a curvature of a lane identified by a pair of right and left demarcation lines XL and XR and the rate of change in curvature (RCv) is a space differential value of the curvature.

Moreover, the vehicle lateral position (Cd) is a gap between the middle position Xc of the lane and the vehicle 1, the lane tilt (Rdr) is a tilt of the lane relative to a traveling direction (Cdr) of the vehicle 1, and the lane width (Rw) is a distance between the left demarcation line XL and the right demarcation line XR.

Furthermore, referring to FIG. 3, the variation in the lane width ΔRw is a difference between a lane width Rw1 in a near position L1 from the vehicle 1 (for example, a spot whose distance is 0 m from the vehicle 1) and a lane width Rw2 in a far position L2 from the vehicle 1 (for example, a spot whose distance is 30 m from the vehicle 1).

When the left demarcation line XL and the right demarcation line XR of the lane on which the vehicle 1 is traveling are straight tracks in parallel with each other, the variation in the lane width ΔRw is almost zero. In contrast, when the left demarcation line XL and the right demarcation line XR of the lane on which the vehicle 1 is traveling are not parallel to each other, the variation in the lane width ΔRw increases as the parallelism decreases.

The road configuration is expressed by the following equation (1), which is a cubic expression, by using a feature value vector:

[Equation 1]

$$Y(X) = \frac{RCvd}{6} \cdot X^3 + \frac{RCv}{2} \cdot X^2 - \tan Rdr \qquad (1)$$

Note, however, that Y is a vertical coordinate (the traveling direction of the vehicle 1) of the real space coordinates with the vehicle 1 as the origin, X is a horizontal coordinate of the real space coordinates with the vehicle 1 as the origin, RCvd is a rate of change in curvature, RCv is a curvature, and Rdr is a lane tilt.

By shifting Y(X) to the left in the lane width direction by a half of the lane width (Rw) and further shifting Y(X) to the left in the lane width direction by the vehicle lateral position (Cd), the left demarcation line can be expressed. Moreover, by shifting Y(X) to the right in the lane width direction by a half of the lane width (Rw) and further shifting Y(X) to the left in the lane width direction by the vehicle lateral position (Cd), the right demarcation line can be expressed.

Figure 4:
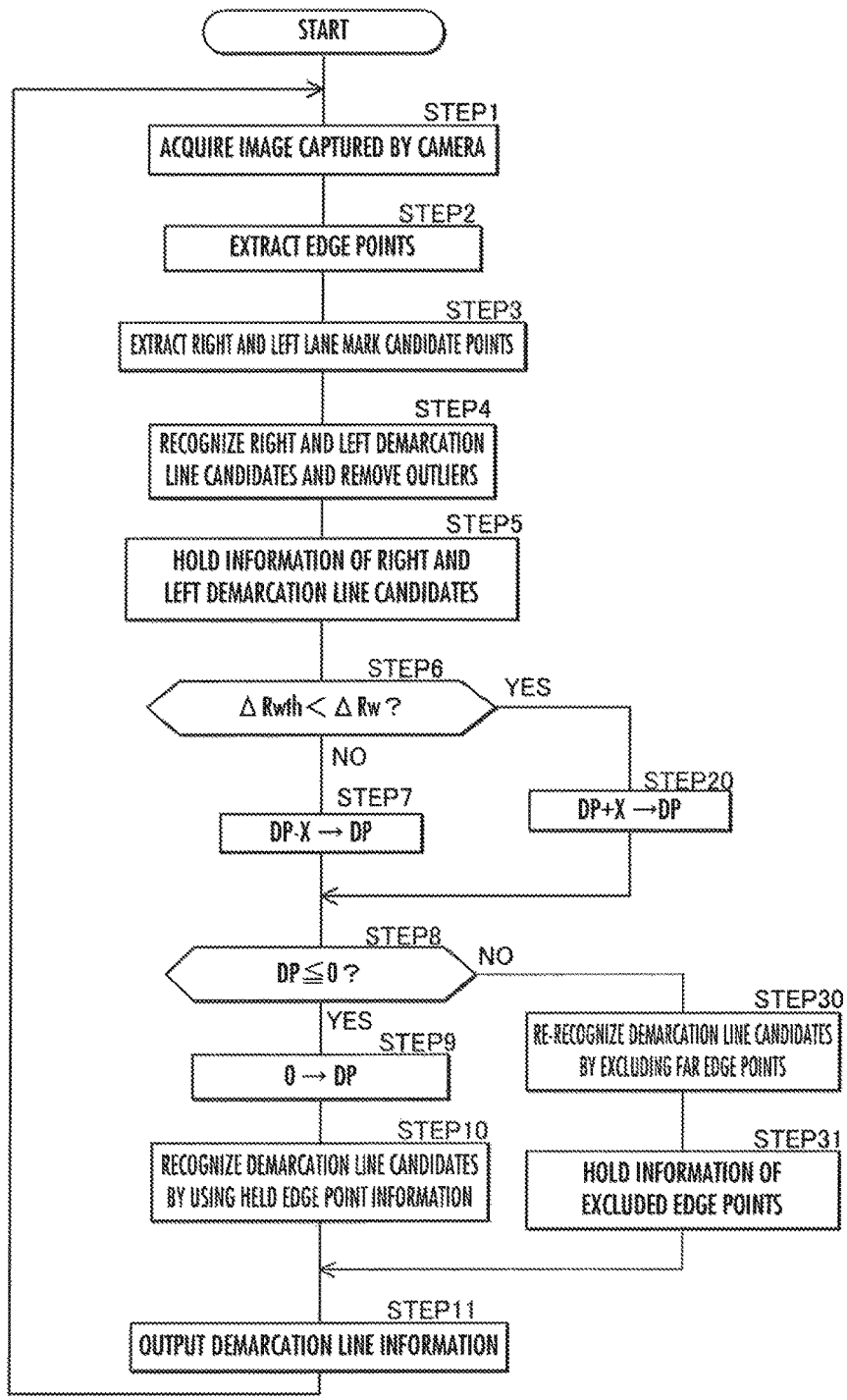
FIG. 4 is a flowchart of lane recognition processing.

With reference to the flowchart illustrated in FIG. 4, the following describes processing of recognizing the shape of the lane on the road on which the vehicle 1 is traveling by using the lane recognition device 10. The lane recognition device 10 recognizes the shape of the lane by executing the flowchart illustrated in FIG. 4 at each predetermined control cycle.

STEP 1 in FIG. 4 is a process performed by the captured image acquiring unit 11. The captured image acquiring unit 11 inputs a video signal of a view of the surroundings (ahead) of the vehicle 1 output from the camera 2 to acquire a color captured image 21 having the R, G, and B values as data of each pixels from the color components (the R, U, and B values) of the video signal. The captured image acquiring unit 11 then holds the data of the captured image 21, which is the view ahead of the vehicle 1, in an image memory 20.

The subsequent STEP 2 is a process performed by the edge image generating unit 12. The edge image generating unit 12 performs a process of transforming the color components of the captured image 21 to the luminance to generate a grayscale image (a multivalued image). Then, the edge image generating unit 12 extracts edge points (pixels [an image portion] whose luminance difference [variation in luminance] from the pixels of the surroundings is a predetermined value or more) from the grayscale image to generate an edge image 22 (see FIG. 1).

In the case where the camera 2 is a monochromatic camera, a grayscale captured image is acquired from the luminance of each of the pixels and therefore it is unnecessary to perform the foregoing process of generating the grayscale image from the color captured image. In addition, the process of extracting the edge points in STEP 2 corresponds to an edge point extracting step in the lane recognition method of the present invention.

Figure 5:
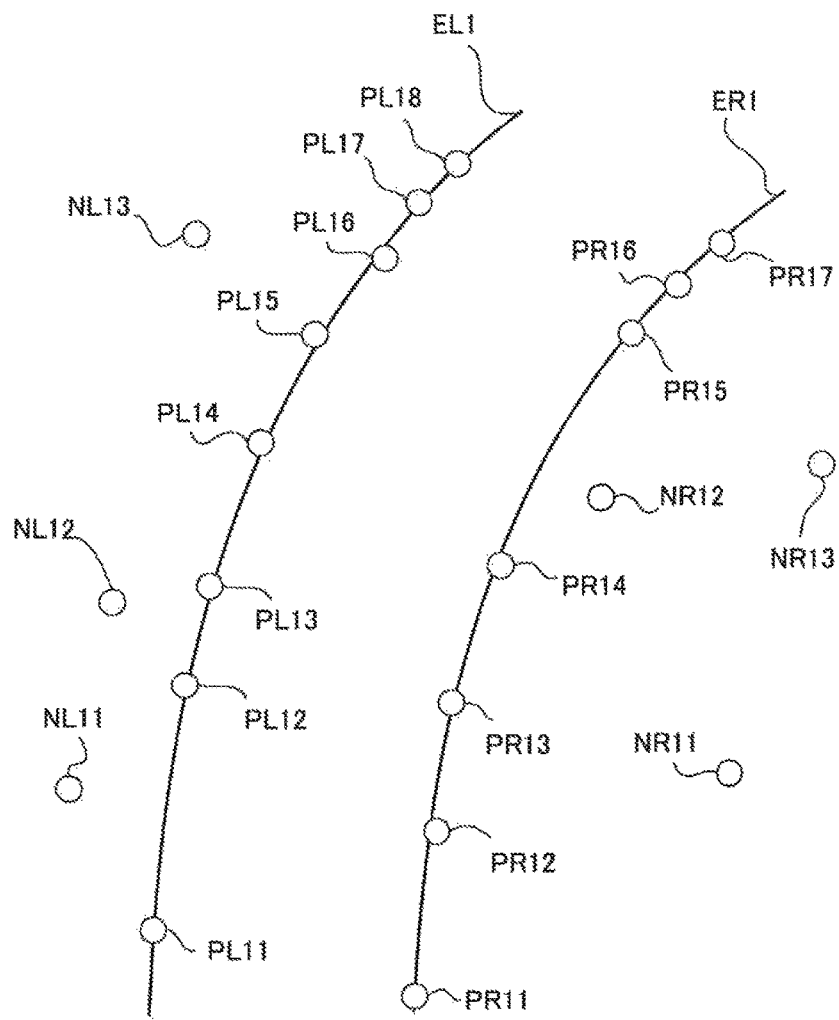
FIG. 5 is an explanatory diagram illustrating estimation processing of feature values of a road.

The subsequent STEP 3 and STEP 4 are processes performed by the demarcation line candidate recognizing unit 13. For example, as illustrated in FIG. 5, the demarcation line candidate recognizing unit 13 selects an edge point sequence PL1 (=PL11, PL12, . . . , and PL18) having continuity which is supposed to be extracted from the left lane mark demarcating the left side of the lane, from the edge image 22 generated in the current control cycle. Moreover, the demarcation line candidate recognizing unit 13 selects an edge point sequence PR1 (=PR11, PR12, . . . , and PR17) having continuity which is supposed to be extracted from the right lane mark demarcating the right side of the lane.

Thereafter, the demarcation line candidate recognizing unit 13 recognizes a left demarcation line candidate EL1 by approximating the edge point sequence PL1 on the left side by the least square method using a quadratic or cubic expression. Furthermore, the demarcation line candidate recognizing unit 13 removes edge points NL11, NL12, and NL13, whose distance from the left demarcation line candidate EL1 is a predetermined distance or more, as outliers (noises).

Similarly, the demarcation line candidate recognizing unit 13 recognizes a right demarcation line candidate ER1 by approximating the edge point sequence PR1 (PR11, PR12, . . . , and PR17) on the right side by the least square method using a quadratic or cubic expression. Furthermore, the demarcation line candidate recognizing unit 13 removes edge points NR11, NR12, and NR13, whose distance from the right demarcation line candidate ER1 is a predetermined distance or more, as outliers (noises).

Incidentally, the process of recognizing the right and left demarcation line candidates in STEP 4 corresponds to a demarcation line candidate recognizing step in the lane recognition method of the present invention.

In the next STEP 5, the demarcation line candidate recognizing unit 13 obtains a feature value vector VR1 of the road configuration in the current control cycle based on the left demarcation line candidate EL1 and the right demarcation line candidate ER1. Then, the demarcation line candidate recognizing unit 13 holds data of the feature value vector VR1, as data of a feature value vector VR2 which is used for filtering processing (particle filtering processing) using an edge point sequence in the next control cycle, in the memory.

Moreover, the demarcation line candidate recognizing unit 13 associates data of the edge point sequences PR1 and PL1 (position data), as data of the edge point sequences PL2 (on the left demarcation line side) and PR2 (on the right demarcation line side) which is used for particle filtering processing in the next control cycle, with the feature value vector VR2 and holds the data in the memory.

Figure 6:
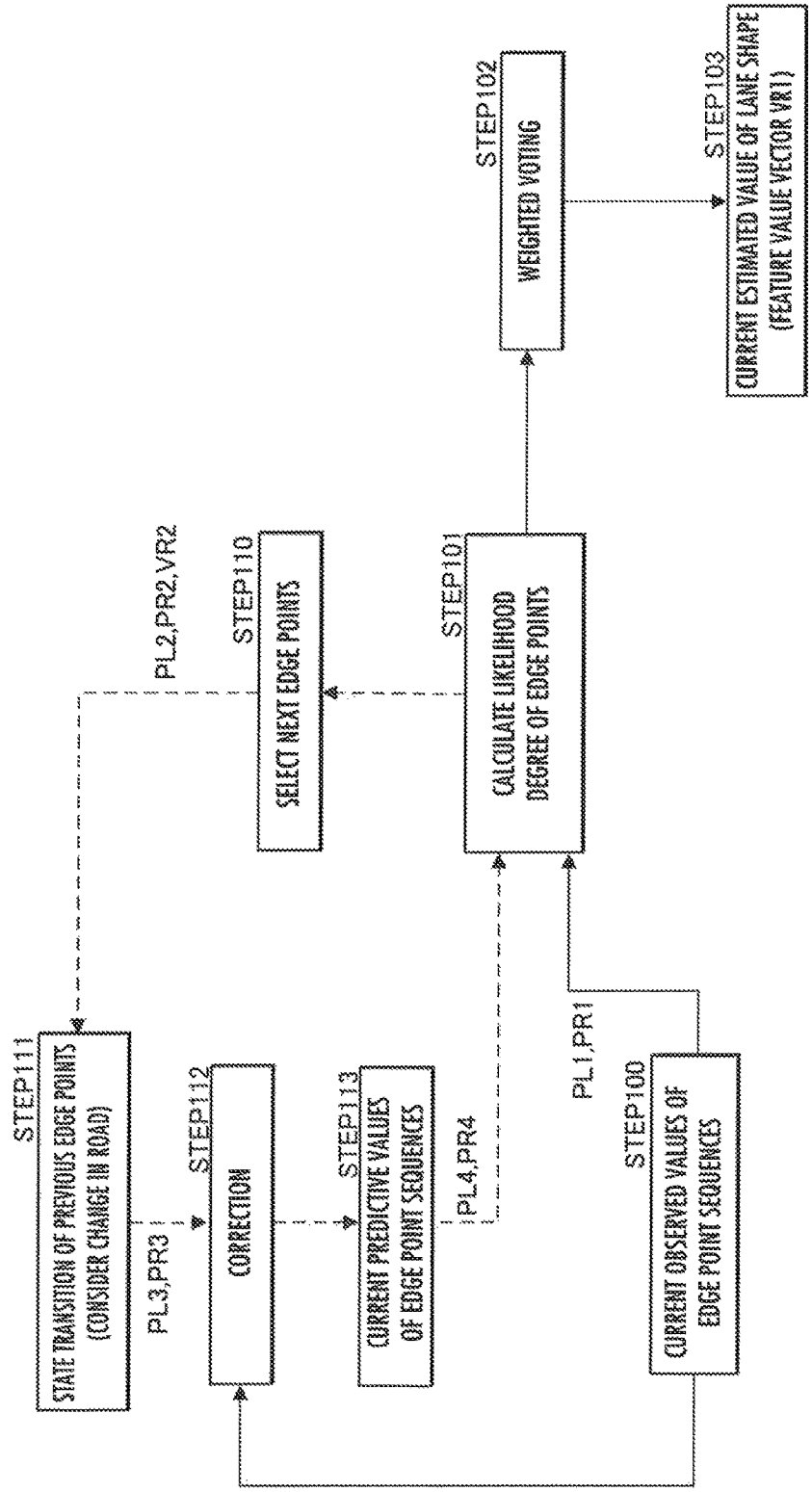
FIG. 6 is an explanatory diagram illustrating filtering with a particle vector.

In the next and subsequent control cycles, the demarcation line candidate recognizing unit 13 performs the particle filtering processing illustrated in FIG. 6 and calculates the feature value vector VR1 of the road configuration.

Referring to FIG. 6, the demarcation line candidate recognizing unit 13 calculates edge point sequences PL3 and PR3, which have been obtained by transition of (by moving) the edge point sequences PL2 and PR2 held in the previous control cycle based on the road configuration represented by the feature value vector VR2 held in the previous control cycle and the vehicle speed or the like of the vehicle 1, in STEP 111.

In the next STEP 112, the demarcation line candidate recognizing unit 13 performs correction by excluding edge points, whose distance from the left demarcation line candidate EL1 or the right demarcation line candidate ER1 recognized from the observed value (the current observed value) PL1 or PR1 of the edge point sequence in the current control cycle is a predetermined distance or more, from the edge point sequence PL3 or PR3. Thereafter, in STEP 113, the demarcation line candidate recognizing unit 13 assumes the edge point sequences corrected in STEP 112 to be predictive values (the current predictive values) PL4 and PR4 of the edge point sequences in the current control cycle.

In STEP 101, the demarcation line candidate recognizing unit 13 calculates a likelihood representing coincidence degree between the predictive values PL4 and PR4 of the edge point sequences in the current control cycle calculated as described above and the observed values PL1 and PR1 of the edge point sequences. More specifically, the demarcation line candidate recognizing unit 13 calculates the likelihood degree by finding the inverse of a distance between the cubic expression, which is represented by the foregoing equation (1) recognized from the edge point sequences of the current observed values PL1 and PR1, and each edge points of the edge point sequences of the current observed values PL1 and PR1 and the edge point sequences of the current predictive values PL4 and PR4.

Furthermore, the demarcation line candidate recognizing unit 13 selects a predetermined number of edge points in descending order of likelihood degree in STEP 110 and holds the edges points as edge point sequences PL2 and PR2 for use in the next control cycle in the memory. Moreover, the demarcation line candidate recognizing unit 13 weights the edge point sequences of the current observed values PL1 and PR1 and the current predictive values PR4 and PL4 by likelihood degree in STEP 102 and then calculates the feature value vector VR1 as an estimated value of the road configuration in the current control cycle in STEP 103.

STEPS 6 to 11, 30, and 31 in FIG. 4 are processes performed by the demarcation line candidate modifying unit 14. In STEP 6, the demarcation line candidate modifying unit 14 determines whether or not the variation in the lane width $\Delta Rw$ of the feature value vector VR1 is more than a parallelism threshold value $\Delta Rwth$. Note here that the variation in the lane width $\Delta Rw$ increases as parallelism between the right and left demarcation lines decreases when the lane widens ahead.

If the variation in the lane width $\Delta Rw$ is more than the parallelism threshold value $\Delta Rwth$ (if the parallelism between the right and left demarcation lines is equal to or less than a predetermined level), the demarcation line candidate modifying unit 14 branches to STEP 20 to add a certain value X to a parallelism variable DP. On the other hand, if the variation in the lane width $\Delta Rw$ is equal to or less than the parallelism threshold value $\Delta Rwth$, the processing proceeds to STEP 7, in which the demarcation line candidate modifying unit 14 subtracts X from the parallelism variable DP.

In STEP 8, the demarcation line candidate modifying unit determines whether or not the parallelism variable DP is zero or less. If the parallelism variable DP is more than zero (when the right and left demarcation lines are not parallel), the processing proceeds to STEP 30.

Figure 7:
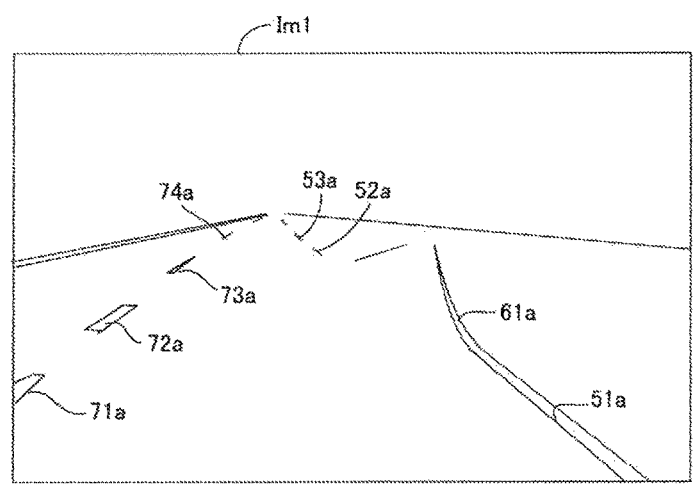
FIG. 7 is an explanatory diagram illustrating a captured image of a branch point on a road.

In this regard, FIG. 7 illustrates an image Im1 of a view ahead of the vehicle 1 captured by the camera 2. The image Im1 includes image portions 71a to 74a of a dashed-line lane mark which defines the left demarcation line on a main lane on which the vehicle 1 is traveling, an image portion 51a of a continuous-line lane mark which defines the right demarcation line on the main lane, image portions 52a and 53a of a dashed-line lane mark, and an image portion 61a which defines a demarcation line on a branch lane branched from the main lane.

Figure 8:
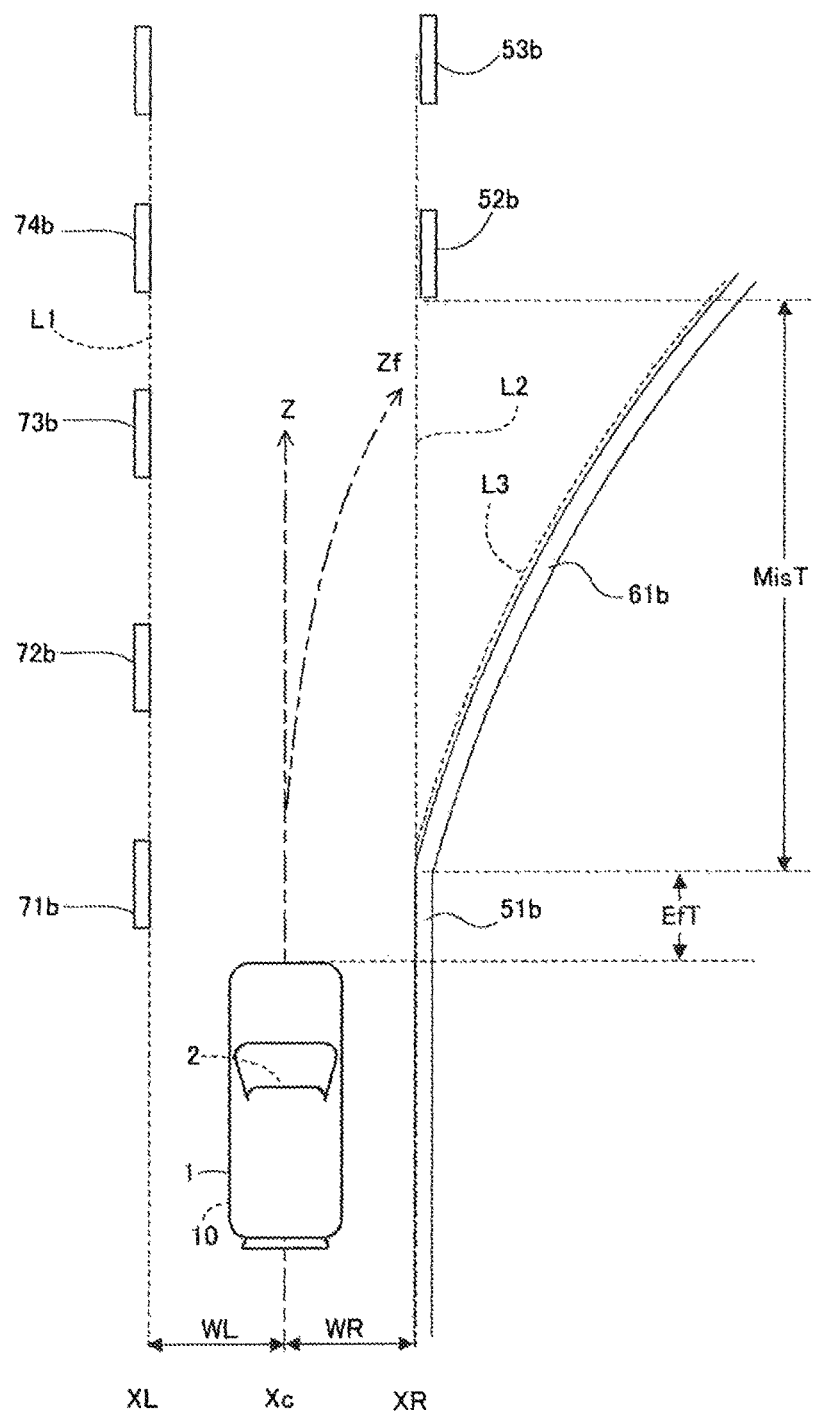
FIG. 8 is an explanatory diagram illustrating the branch point on the road in a real space.

The image portions of the respective lane marks included in the captured image in FIG. 7 transformed into the real space positions are as illustrated in FIG. 8. FIG. 8 illustrates a lane mark 71b to 74b for a left demarcation line L1 on the main lane transformed from the image portions 71a to 74a, a lane mark 51b to 53b for a right demarcation line L2 on the main lane transformed from the image portions 51a to 53a, and a lane mark 61b for a branch lane transformed from the image portion 61a.

In this situation, the steering control unit 16 illustrated in FIG. 1 recognizes the positions of the left demarcation line and the right demarcation line of the lane from information on the feature value vector VR1 of the road configuration calculated by the demarcation line candidate modifying unit 14 and performs steering control so that the vehicle 1 travels in the middle position between the position XL of the left demarcation line and the position XR of the right demarcation line.

Therefore, as illustrated in FIG. 8, when the vehicle 1 is traveling at a branch point, if the steering control unit 16 erroneously recognizes the lane mark 61b of the branch lane as a lane mark on the main lane, and performs steering control of the vehicle 1 while assuming the demarcation line L3 of the branch lane recognized from the lane mark 61b to be the right demarcation line on the main lane, the vehicle 1 deviates to the middle position between the left demarcation line L1 on the main lane and the demarcation line L3 on the branch lane as indicated by Zf.

Accordingly, if determining that the parallelism variable DP is more than zero in STEP 8, the demarcation line candidate modifying unit 14 re-recognizes the demarcation line candidate by excluding far edge points in STEP 30. In the example of FIG. 8, due to the exclusion of the edge points in the positions corresponding to a zone MisT on which the lane mark defining the right demarcation line on the main lane is not laid, edge points whose corresponding real space positions are EfT or more away from the vehicle 1 are excluded.

By excluding the edge points whose corresponding real space positions are a predetermined distance or more away from the vehicle 1 as described above, the right demarcation line L2 is able to be re-recognized based on the position of the lane mark which defines the right demarcation line of the main lane before the branch is started. Furthermore, this prevents the demarcation line L3 of the branch lane from being erroneously recognized as the right demarcation line of the main lane.

In this case, the information on the edge points excluded in STEP 30 is deleted from the candidates PR3 and PL3 for the next edge point sequences selected in STEP 110 of FIG. 6. Moreover, the feature value vector VR2 used in the next control cycle is modified based on the demarcation line candidates re-recognized in STEP 30.

The process of STEP 30 corresponds to a demarcation line candidate modifying step in the lane recognition method of the present invention.

In the next STEP 31, the demarcation line candidate modifying unit 14 holds information of the edge points (position data of the edge points) excluded in STEP 30 in the memory by the excluded edge point information holding unit 15 and then proceeds to STEP 11 to output information on demarcation line candidates to a steering device and returns to STEP 1. The process of STEP 31 corresponds to an excluded edge point information holding step in the lane recognition method of the present invention.

On the other hand, if the parallelism variable DP is zero or less (if the right and left demarcation line candidates are parallel to each other) in STEP 8, the processing proceeds to STEP 9, in which the demarcation line candidate modifying unit 14 adjusts the parallelism variable DP to zero. Furthermore, if there are edge points (information on the edge points excluded in STEP 30) held by the excluded edge point information holding unit 15 in the next STEP 10, the demarcation line candidates are recognized also by using the information on these edge points and the processing proceeds to STEP 11.

In this case, in STEPS 101 and 110 in FIG. 6, the likelihood degree of each of the edge points including the edge points excluded once is calculated and edge points used in the next control cycle are selected.

If it is temporarily determined that the right and left demarcation line candidates are not parallel to each other due to the influence of vibration or the like of the vehicle 1 by using the information on the edge points excluded once as described above, the demarcation lines on the original main lane are able to be recognized quickly when the influence is withdrawn.

The process of re-recognizing the demarcation line candidate by using the edge points excluded once when the right and left demarcation line candidates return to be parallel to each other in STEP 10 corresponds to a parallelism recovering step in the lane recognition method of the present invention.

Modified Embodiment

After the lane mark 52*b* ahead of the branch point begins to be recognized as illustrated in FIG. 8, the lane mark 53*b* and the lane mark 51*b* may be joined together so that the right demarcation line is recognized if the continuity between the lane mark 52*b* and the lane mark 51*b* in the vicinity of the vehicle 1 is determined to be equal to or higher than a predetermined level.

Moreover, it is also possible to determine the parallelism between the pair of right and left demarcation line candidates by the demarcation line candidate modifying unit 14 at a plurality of places each located a given distance (for example, 2 m) away from the vehicle 1 and to consider the distance between the vehicle 1 and the place where the parallelism between the pair of right and left demarcation line candidates is equal to or less than a predetermined level as a distance EfT which is determined to be far in STEP 30 in FIG. 4.

DESCRIPTION OF REFERENCE NUMERALS

1 Vehicle (self-vehicle)
2 Camera
7 Steering device
10 Lane recognition device
11 Captured image acquiring unit
12 Edge image generating unit
13 Demarcation line candidate recognizing unit
14 Demarcation line candidate modifying unit
15 Excluded edge point information holding unit
20 Image memory
21 Captured image
22 Edge image

What is claimed is:

1. A lane recognition device comprising:
an edge point extracting unit which extracts edge points whose luminance difference from a surrounding portion is equal to or more than a predetermined level from an image captured by a camera mounted in a vehicle;
a demarcation line candidate recognizing unit which recognizes demarcation line candidates which are candidates for a pair of right and left demarcation lines demarcating a lane based on the edge points having predetermined continuity; and
a demarcation line candidate modifying unit which excludes edge points whose corresponding positions in a real space are a predetermined distance or more away from the camera in a traveling direction of the vehicle in a case where parallelism between the pair of right and left demarcation line candidates recognized by the demarcation line candidate recognizing unit is equal to or less than a predetermined level and re-recognizes the pair of right and left demarcation line candidates based on a first edge point sequence having the predetermined continuity among the edge points which were not excluded,
wherein in the case where the parallelism between the pair of right and left demarcation line candidates recognized by the demarcation line candidate recognizing unit is the predetermined level or less, and when a second edge point sequence, having predetermined continuity to the first edge point sequence, begins to be detected at the predetermined distance or more away, the demarcation line candidate modifying unit recognizes the demarcation line candidate by joining both of the first and second edge point sequences together.

2. The lane recognition device according to claim 1, further comprising an edge point information holding unit which holds information of the edge points excluded by the demarcation line candidate modifying unit,
wherein in a case where the parallelism between the pair of recognized right and left demarcation line candidates shifts from a state of being the predetermined level or less to a state of exceeding the predetermined level, the demarcation line candidate recognizing unit recognizes the pair of demarcation line candidates by using the information of the edge points held by the edge point information holding unit in a next demarcation line candidate recognizing process.

3. The lane recognition device according to claim 1, wherein the demarcation line candidate modifying unit determines the parallelism between the pair of right and left demarcation line candidates at a plurality of places each located a given distance from the vehicle and considers a distance between a place where the parallelism between the pair of right and left demarcation line candidates is the predetermined level or less and the vehicle as the predetermined distance.

4. The lane recognition device according to claim 1, further comprising a steering control unit which controls a steering mechanism of the vehicle so that the vehicle travels in a vicinity of an intermediate position between the pair of right and left demarcation line candidates recognized by the demarcation line candidate recognizing unit.

5. The lane recognition device according to claim 1, wherein the demarcation line candidate modifying unit determines the parallelism between the pair of right and left demarcation line candidates at a plurality of places each located a given distance from the vehicle and considers a distance between a place where the parallelism between the pair of right and left demarcation line candidates is the predetermined level or less and the vehicle as the predetermined distance.

6. A vehicle comprising:
   a camera which captures an image of surroundings;
   an edge point extracting unit which extracts edge points whose luminance difference from a surrounding portion is equal to or more than a predetermined level from an image captured by the camera;
   a demarcation line candidate recognizing unit which recognizes demarcation line candidates which are candidates for a pair of right and left demarcation lines demarcating a lane based on the edge points having predetermined continuity; and
   a demarcation line candidate modifying unit which excludes edge points whose corresponding positions in a real space are a predetermined distance or more away from the camera in a traveling direction of the vehicle in a case where parallelism between the pair of right and left demarcation line candidates recognized by the demarcation line candidate recognizing unit is equal to or less than a predetermined level and re-recognizes the pair of right and left demarcation line candidates based on a first edge point sequence having the predetermined continuity among the edge points which were not excluded,
   wherein in the case where the parallelism between the pair of right and left demarcation line candidates recognized by the demarcation line candidate recognizing unit is the predetermined level or less, and when a second edge point sequence, having predetermined continuity to the first edge point sequence, begins to be detected at the predetermined distance or more away, the demarcation line candidate modifying unit recognizes the demarcation line candidate by joining both of the first and second edge point sequences together.

7. A lane recognition method comprising:
   an edge point extracting step of extracting edge points whose luminance difference from a surrounding portion is equal to or more than a predetermined level from an image captured by a camera mounted in a vehicle;
   a demarcation line candidate recognizing step of recognizing demarcation line candidates which are candidates for a pair of right and left demarcation lines demarcating a lane based on the edge points having predetermined continuity;
   a demarcation line candidate modifying step of excluding edge points whose corresponding positions in a real space are a predetermined distance or more away from the camera in a traveling direction of the vehicle in a case where parallelism between the pair of right and left demarcation line candidates recognized in the demarcation line candidate recognizing step is equal to or less than a predetermined level and re-recognizing the pair of right and left demarcation line candidates based on a first edge point sequence having the predetermined continuity among the edge points which were not excluded;
   an excluded edge point information holding step of holding information of the edge points excluded in the demarcation line candidate modifying step; and
   a parallelism recovering step of recognizing the pair of demarcation line candidates by using the information of the edge points held in the excluded edge point information holding step in a next demarcation line candidate recognizing step in a case where the parallelism between the pair of right and left demarcation line candidates recognized in the demarcation line candidate recognizing step shifts from a state of being the predetermined level or less to a state of exceeding the predetermined level,
   wherein in the case where the parallelism between the pair of right and left demarcation line candidates recognized by the demarcation line candidate recognizing step is the predetermined level or less, and when a second edge point sequence, having predetermined continuity to the first edge point sequence, begins to be detected at the predetermined distance or more away, the demarcation line candidate modifying step recognizes the demarcation line candidate by joining both of the first and second edge point sequences together.

* * * * *